United States Patent
Hogg et al.

(10) Patent No.: US 7,266,122 B1
(45) Date of Patent: Sep. 4, 2007

(54) SYSTEM AND METHOD FOR ALLOCATING BANDWIDTH IN A COMMUNICATIONS ENVIRONMENT

(75) Inventors: Raymond L. Hogg, Wylie, TX (US); Gustavo de Veciana, Austin, TX (US); Robert H. Whitcher, Austin, TX (US); Anthony H. Anconetani, Round Rock, TX (US)

(73) Assignee: GenBand Inc., Austin, TX (US)

( * ) Notice: Subject to any disclaimer, the term of this patent is extended or adjusted under 35 U.S.C. 154(b) by 964 days.

(21) Appl. No.: 10/306,904

(22) Filed: Nov. 27, 2002

(51) Int. Cl.
*H04L 12/56* (2006.01)
*H04M 11/00* (2006.01)

(52) U.S. Cl. ............ 370/395.41; 370/392; 370/395.53; 379/93.07; 725/95

(58) Field of Classification Search ................ 370/352, 370/389, 392, 342, 400–410, 468, 395.41–395.53, 370/474; 379/88.17, 93.07, 900, 93.7; 725/95
See application file for complete search history.

(56) References Cited

U.S. PATENT DOCUMENTS

| | | | | |
|---|---|---|---|---|
| 6,091,725 A | * | 7/2000 | Cheriton et al. | 370/392 |
| 6,335,927 B1 | * | 1/2002 | Elliott et al. | 370/352 |
| 6,754,181 B1 | * | 6/2004 | Elliott et al. | 370/252 |
| 6,909,708 B1 | * | 6/2005 | Krishnaswamy et al. | 370/352 |
| 7,120,139 B1 | * | 10/2006 | Kung et al. | 370/352 |
| 7,145,898 B1 | * | 12/2006 | Elliott | 370/352 |

* cited by examiner

*Primary Examiner*—Afsar Qureshi
(74) *Attorney, Agent, or Firm*—Baker Botts L.L.P.

(57) ABSTRACT

A method for allocating bandwidth in a communications environment is provided that includes receiving one or more data streams associated with one or more subscribers at a voice gateway. One or more algorithms included in the voice gateway are executed that are associated with traffic management of the data streams in order to generate a designated bandwidth value associated with one or more of the data streams. The designated bandwidth value is assigned to one or more of the data streams based on one or more of the algorithms that use an aggregation of one or more activity characteristics associated with a selected one or more of the subscribers.

40 Claims, 2 Drawing Sheets

SYSTEM AND METHOD FOR ALLOCATING BANDWIDTH IN A COMMUNICATIONS ENVIRONMENT

TECHNICAL FIELD OF THE INVENTION

This invention relates in general to network communications and more particularly to a system and method for allocating bandwidth in a communications environment.

BACKGROUND OF THE INVENTION

Network communications have become increasingly important in today's society. Equally important may be the concept of bandwidth which generally refers to one or more network resources or data pathways that may be provisioned for data flows, communication streams, or information propagation. The ability to properly allocate bandwidth may be critical for achieving efficient communications and for ensuring that components within a network architecture are not overtaxed. Overburdened systems may fail to provide promised capabilities to one or more end users or entities or negatively affect services and features associated with a given communications protocol.

Another concern that may be associated with bandwidth allocation arises when a system designer or a network engineer attempts to approximate a minimum requisite bandwidth value that properly accommodates all users or entities coupled to an associated communications platform. Rudimentary groupings or broad classifications of users often fail to take into account the specific needs of end users or entities within a given system. In addition, such shortsighted approaches in the field of network communications may inhibit the potential for future scalability as a subscriber, a subscriber pool, or an entity group increases in number or grows in bandwidth needs. In an ideal scenario, the growth of a subscriber base should be reflected by corresponding growth associated with a network architecture. Such optimal and flexible parameters may be needed in order to ensure adequate resources are being provided to end users or entities that depend on the network architecture for the propagation of their communication flows.

SUMMARY OF THE INVENTION

From the foregoing, it may be appreciated by those skilled in the art that a need has arisen for an improved communications approach that provides the capability for effective bandwidth allocation to provide optimal data flows in a network environment. In accordance with one embodiment of the present invention, a system and method for allocating bandwidth in a communications environment are provided that substantially eliminate or greatly reduce disadvantages and problems associated with conventional bandwidth allocation techniques.

According to one embodiment of the present invention, there is provided a method for allocating bandwidth in a communications environment that includes receiving one or more data streams associated with one or more subscribers at a voice gateway. One or more algorithms included within the voice gateway are executed that are associated with traffic management of the data streams in order to generate a designated bandwidth value associated with one or more of the data streams. The designated bandwidth value is assigned to one or more of the data streams based on one or more of the algorithms that use an aggregation of one or more activity characteristics associated with a selected one or more of the subscribers.

Certain embodiments of the present invention may provide a number of technical advantages. For example, according to one embodiment of the present invention, a communications approach is provided that is configured to consume a minimal portion of the network resources that may be used to support voice or data services within the network. This configuration further provides enhanced flexibility as it may be implemented for a selected target (subscribed base or grouping) or in accordance with the particular needs of an end user or an entity. Such a configuration further ensures that components and elements within the network architecture may be neither overburdened nor overtaxed by the communication flows that they receive. This may be a result, in part, of one or more algorithms included within the voice gateway. Additionally, such a configuration for bandwidth allocation may include a reservation unit, which represents an additional bandwidth value provisioned for an end user or an entity. The reservation unit may be used as a precautionary measure to ensure the proper execution of one or more services associated with the communications protocol implemented in the system architecture.

Yet another technical advantage associated with one embodiment of the present invention is a result of the creation and assignment of a subscriber to a specific interface group. The interface group may correspond to resource allocations particular to that group of end users or that group of entities. This provides a subscriber-based resource allocation feature that ensures that each subscriber or each entity receives the selected or appropriate quality of service based on their subscription. This interface grouping further simplifies the network architecture and allows for more efficient communications, even during robust time intervals where simultaneous subscriber activity may be occurring. The system architecture, as provided in accordance with the teachings of the present invention, further provides a platform for considerable growth within the network architecture as the number of subscribers or entities associated with the network grow. This scalability feature may further provide for more economical incrementations of networking equipment to existing system architectures. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference may be made to the following description, taken in conjunction with the accompanying figures, wherein like reference numerals represent like parts, in which.

DETAILED DESCRIPTION OF THE INVENTION

Figure 1:
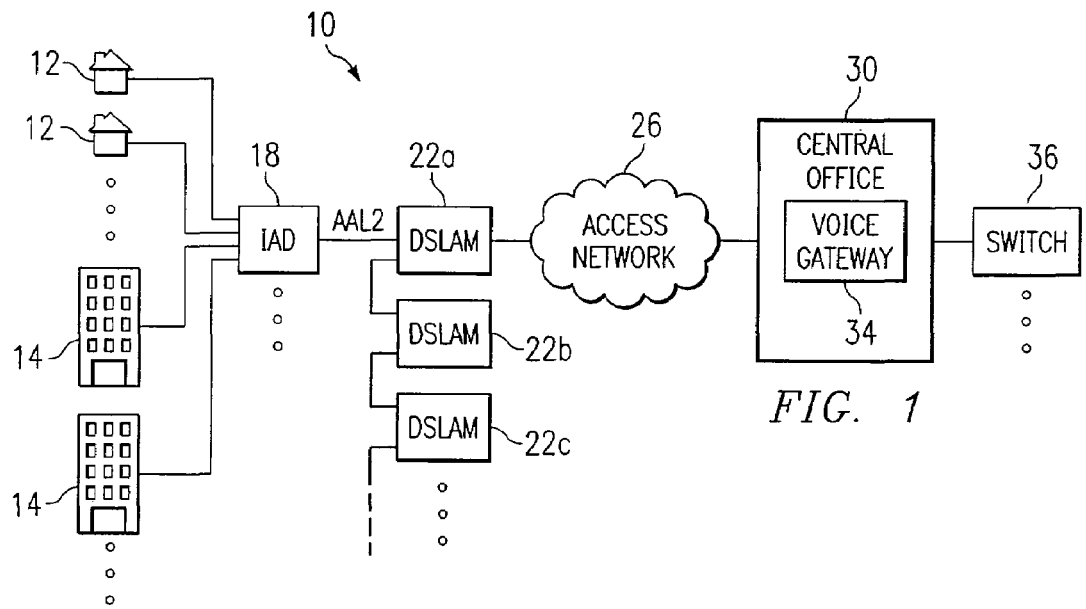
FIG. 1 is a simplified block diagram of a communication system for allocating bandwidth in a network environment in accordance with one embodiment of the present invention.

FIG. 1 is a simplified block diagram of a communication system 10 for allocating bandwidth in a network environment. Communication system 10 includes multiple subscribers 12 and multiple business entities 14 coupled to an integrated access device (IAD) 18. Communication system 10 further includes a set of digital subscriber line access multiplexers (DSLAMs) 22a-c, an access network 26, a central office (CO) 30, a voice gateway 34 included within CO 30, and a switch 36. In such an arrangement, communication system 10 offers an example configuration for data propagation in a network environment. It is critical to note that this overview is provided only for purposes of illustration and teaching and may be varied or modified considerably where appropriate and according to particular communication needs.

Any selected one of subscribers 12 or business entities 14 may generate a data stream of communication that may propagate over digital subscriber line (DSL) links and to IAD 18. IAD 18 may then communicate with a selected DSLAM 22a-c using an asynchronous transfer mode (ATM) adaptation layer two (AAL2) communications protocol. Such a communications protocol may be over suitable communication links, such as via a virtual connection or channel (VC), a virtual path (VP), or virtual path connection (VPC). The communications between subscribers 12 and business entities 14 to a selected DSLAM 22a-c may be substituted by any other adequate communications platform, such as Ethernet for example, where suitable segmentation and reassembly (SAR) elements are provided to communication system 10 to 22a-22c may include a local (or a remote) Class 5 switch. Such implementations may be dependent on whether a distributed or a centralized ATM model is being implemented.

Access network 26 represents a generic network that includes a series of points or nodes of interconnected communication paths for receiving and transmitting packets of data that are propagating through communication system 10. Access network 26 may facilitate the transmission and delivery of ATM operations, Internet Protocol (IP) communications, Frame Relay, or Ethernet communication protocols. Access network 26 may be coupled to CO 30 and may use a DS3/OC3 communications link to transfer information from one point to the next. Alternatively, any of the communications between the elements (or internal communications) illustrated in FIG. 1 may use any other suitable communications link, such as T1, T3, DS3, OC12 or OC48 lines for example.

CO 30 is a network office that comprises switching equipment that functions to receive and to retransmit data received from subscribers 12 or business entities 14. CO 30 may be positioned in a locality where a subscriber base may be connected on a local loop. The term 'local loop' refers to the connection lines from a telephone company's CO that may be positioned in a locality of its subscriber's telephones for its client end users. The local loop may carry digital signals directly to and from an end user and access network 26. CO 30 may in turn exchange data or information over a GR303, TR-08, TI-CAS, or any other suitable communications protocol as described above. Because further process the data streams. Additionally, IAD 18 may be substituted with a customer premise equipment (CPE) element or any other suitable element, component, or object that includes one or more corresponding (and assigned number) VCs or VPs.

DSLAMs 22a-c represent network devices that may be provided within a CO (for example) that receive signals from multiple subscribers 12 or multiple business entities 14 over DSL connections where the signals may be processed using multiplexing techniques. Multiplexing refers to the communication or transmission of multiple signals or streams of information on a carrier at the same time in the form of a single complex signal and then recovering the separate signals at a receiving node. DSLAMs 22a-c may enable a phone company or service provider to offer multiple subscribers 12 or multiple business entities 14 DSL technology. DSL generally refers to a protocol for bringing high-bandwidth data or information to homes and businesses over telephone lines. DSL, as referred to herein in this document, may be inclusive of variations of DSL, such as asymmetric DSL (ADSL), high-bit rate DSL (HDSL), rate-adaptive DSL (RADSL), and xDSL, et al. In certain instances, DSLAMs 22a-c may facilitate data conversion from a raw format to an ATM format and to an Ethernet format where appropriate at ATM adaptation layers one through five (AAL1-AAL5) in accordance with particular needs.

DSLAMs 22a-22c may be subnetworked together or daisy-chained where appropriate. DSLAMs 22a-22c may serve the communication needs of multiple residents or entities such as subscribers 12 or business entities 14. Where appropriate, any selected one or more of DSLAMs voice gateway 34 may represent a voice over ATM or Ethernet model, an AAL2 stream of information may be received and converted into time-division multiplex (TDM) communication segments at CO 30.

Switch 36 is a Class 5 switch operable to support multiple interfaces to additional Class 5 switches where appropriate. Alternatively, switch 36 may be any other suitable data exchange or data processing hardware, software, component, element, or object. Switch 36 operates to guide one or more subscribers remotely through a network and provides information to other Class 5 switches. Switch 36 and voice gateway 34 may support or serve remote Class 5 switches (where appropriate) that execute AAL2 switching operations.

For multiple lines coupled to IAD 18 (or multiple CPEs), various interface groups may be created and managed for subscribers 12 and business entities 14 within communication system 10. AAL2 switching functions may be executed where the channels within an AAL2 stream (subchannels) may be demultiplexed into component channels. This may occur within voice gateway 34 such that any selected AAL2 stream or link may be assigned to a corresponding interface group. This would allow the aggregation of multiple subscribers, with multiple incoming data streams being multiplexed such that an aggregation mean may be created and stored in voice gateway 34. This data may be implemented in the form of one or more algorithms that may operate to control networking parameters such as bandwidth allocation, traffic management, or traffic scheduling for example. This may allow, for example, several subscribers to be multiplexed and then carried over a single VC or VP through the network. This may allow for effective traffic management, optimal traffic shaping, and precise bandwidth allocation provided to end users or a subscribe base of communication system 10.

Figure 2:
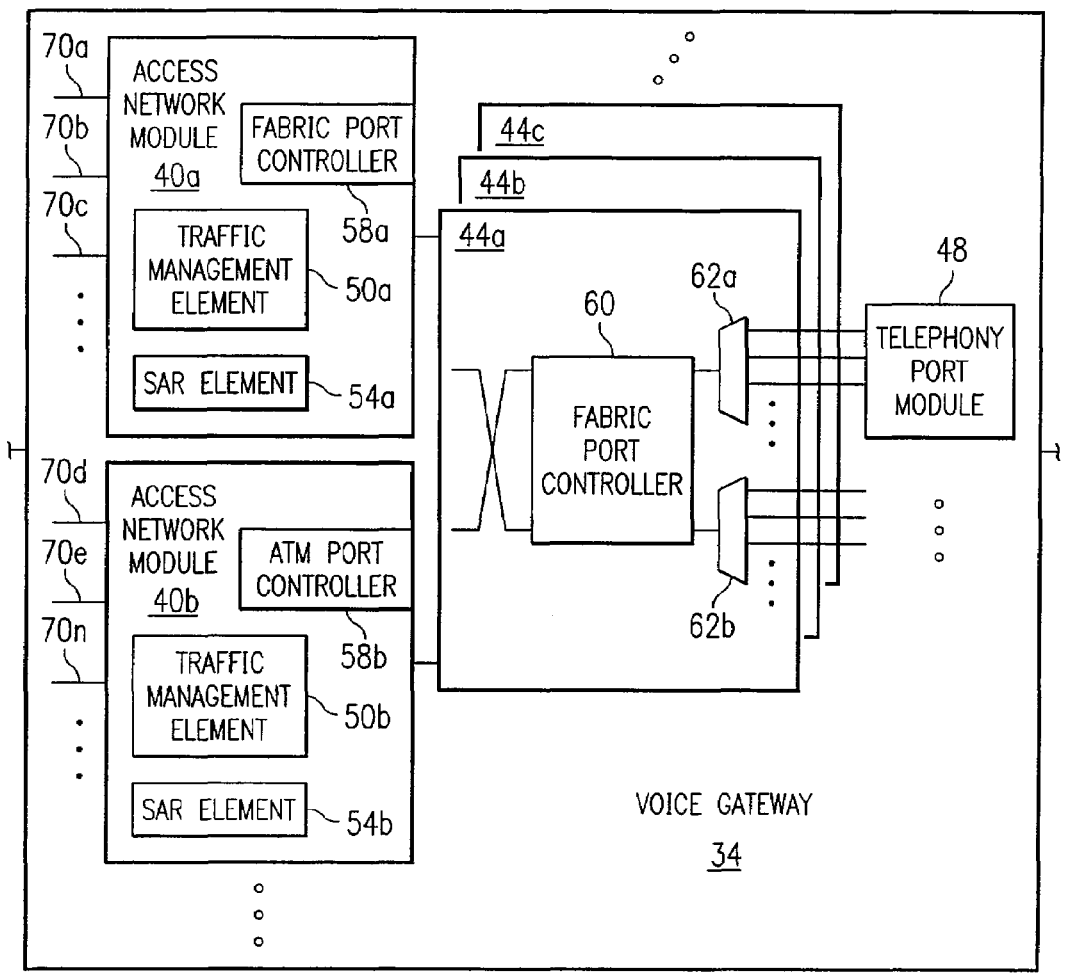
FIG. 2 is a simplified block diagram of a voice gateway that may be included within the communication system of FIG. 1.
Figure 3:
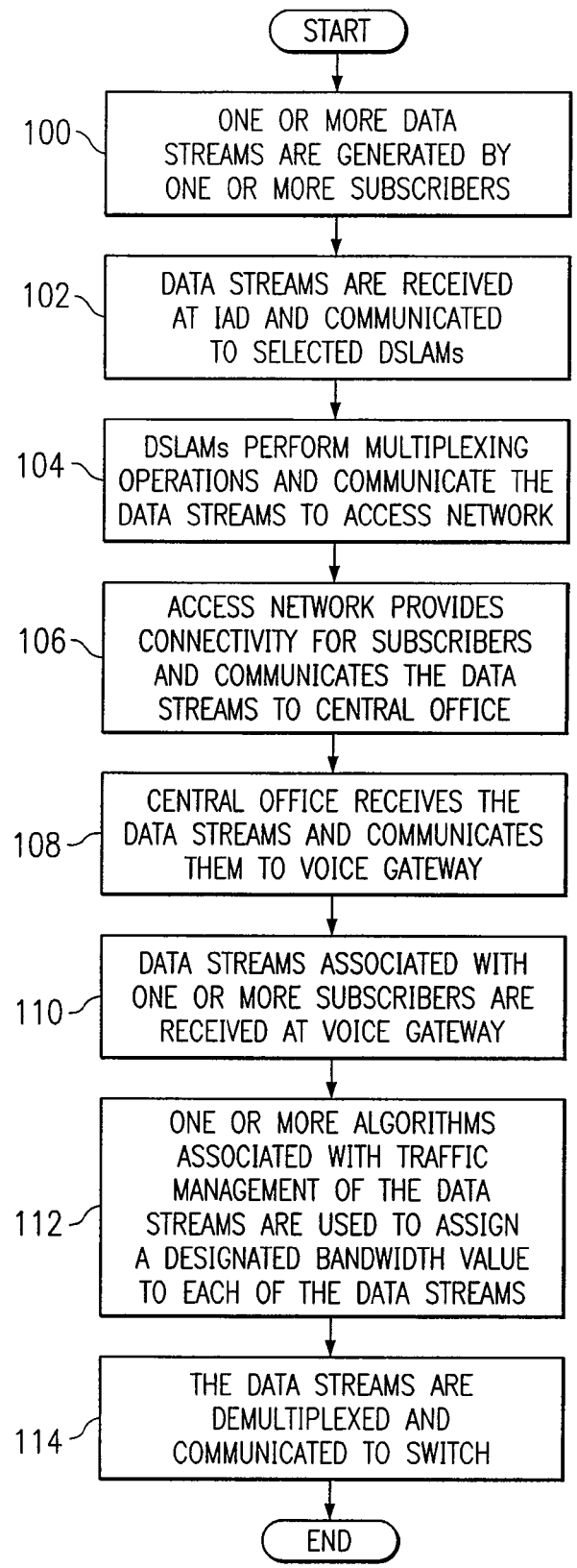
FIG. 3 is a flowchart illustrating a series of steps associated with an overview for generating a data stream and for allocating bandwidth for the data stream in a network environment.

FIG. 2 is a simplified block diagram of voice gateway 34 in accordance with one embodiment of the present invention. Voice gateway 34 includes multiple access network modules (ANMs) 40a and 40b, multiple switch fabric elements 44a-44c, and a telephony port module (TPM) 48.

ANMs 40a and 40b may each include a traffic management element 50a and 50b, a segmentation and reassembly (SAR) element 54a and 54b, and an ATM port controller 58a and 58b. In addition, each switch fabric element 44a-44c may also include a fabric port controller 60, and multiple demultiplexers 62a and 62b. Voice gateway 34 may receive information in a native ATM format, an Ethernet format (whereby SAR elements 54a and 54b are invoked), over DS3/OC3 communication links, or via any other suitable communications protocol. This information may be being provided on inputs 70a-70n that represent one or more subscribers coupled to voice gateway 34.

In accordance with the teachings of the present invention, voice gateway 34 operates to provide one or more algorithms to be used in allocating bandwidth in a network environment. The algorithms may be based on an aggregation of one or more subscribers corresponding to multiple inputs 70a-70n coupled to ANMs 40a and 40b. The bandwidth calculation may reflect information that pertains to each individual subscriber and their associated activity. These calculations may implement an Erlang dimensioning or Erlang factor where appropriate that may be multiplied by the available bandwidth in order to calculate a suitable bandwidth value. The Erlang factor may reflect the average utilization of the corresponding subscriber line or the average consumption of bandwidth per communications (DSL) link. (A number of example equations associated with the Erlang factor are provided below and described in greater detail with reference thereto). Multiplying the available bandwidth by the Erlang factor may produce a sustained cell rate of that individual subscriber's contribution to the Ethernet or DSL traffic flow. These results may then be aggregated in order to generate a mean value used to provision bandwidth. Thus, a group of subscribers may be provisioned for a VC or VP. This bandwidth calculation may be performed at any aggregation point or node within communications system 10 or voice gateway 34 in order to predict one or more bandwidth values needed at a given location. Additional details relating to this algorithm and others used for provisioning bandwidth, as well as the potential bandwidth allocation that results from the algorithm, are provided below in greater detail with reference to more specific equations.

Communication system 10 may effectuate integrated VC level traffic shaping and link-scheduling operations that are optimized to support origination of AAL2 derived voice VC level traffic aggregates. This dedicated shaping/scheduling logic may provide dynamic arbitration amongst an extremely large number of AAL2 derived voice VCs for a fixed portion of physical link bandwidth capacity while simultaneously performing VC level peak cell rate (PCR) limiting for each individual connection. Although a fixed partition of physical link bandwidth capacity may be initially reserved/dedicated for this scheduling function, this capacity may in turn be dynamically allocated to all associated AAL2 derived voice traffic aggregates using a work conserving service discipline. Each derived voice traffic aggregate may be shaped to any suitable rate and the scheduling function may operate in an oversubscribed configuration. During an overload condition, the scheduler may ensure fairness by providing each individual backlogged connection rate proportional access to the available reserved capacity.

Before describing the intricate details of the elements within voice gateway 34, it is helpful to provide a general description of some of the strategies to be employed by voice gateway 34 in allocating bandwidth in a network. In addition, for purposes of clarity, the general operations of voice gateway 34 are provided. One approach for provisioning bandwidth or resources that is provided by voice gateway 34 is based on setting several configurable parameters that impact how buffer/bandwidth resources may be shared among service classes on ports and subports of voice gateway 34. Some of these parameters may be set upon initialization, e.g., buffer partitions among service classes, and some serve as planning parameters, which may be adjusted by the operator. Guaranteed bandwidth generally refers to a portion of the bandwidth pool that may be specifically allocated to a traffic flow. Guaranteed bandwidth, may be reserved for, and then subsequently allocated to, various types of traffic flows, e.g. constant bit rate (CBR), real time variable bit rate (RtVBR or RVBR), non-real time variable bit rate (NtVBR or NVBR), unspecified bit rate (UBR), and derived voice applications, all of which may require such guarantees. Specific allocations may be made by configuring the appropriate scheduling policy when a subscriber/VC/VP may be admitted/deleted. Note that depending on how guaranteed bandwidth allocations may be made to a particular (set of) VC/VP(s), if unused, it may or may not be available for other flows to use. For example, a scheduling discipline that permits unused guaranteed bandwidth to benefit other backlogged connections may be usually said to be 'work conserving.' The pool of bandwidth that remains after all guarantees for backlogged flows have been met is the excess or shared bandwidth. Thus the amount of excess bandwidth depends on whether work conserving scheduling disciplines may be being used and the activity (i.e., backlog) of ongoing connections. When excess bandwidth is available, it may be shared across service classes, and then among traffic flows within a given class.

In addition to the problems of defining the characteristics of AAL2 derived voice traffic aggregates and establishing efficient connection admission policies, advanced queuing/scheduling mechanisms may be also employed by voice gateway 34 to help ensure all of the quality of service (QoS) constraints are simultaneously satisfied for all admitted flows. In particular, in a multi-service ATM network environment the queuing/scheduling policies administered within each ATM network element provide adequate separation of services in order to meet the widely disparate demands for resource consumption between connections associated with different service categories.

Traffic policing may be often employed within an ATM network element to ensure that the incoming traffic may be conforming to its associated traffic contract. Adherence by all ingress flows to their corresponding traffic contracts may be important for ensuring the QoS objectives may be achieved for all admitted flows because the admission policies allocate/reserve resources in order to guarantee QoS only to the conforming traffic.

When multiple independent traffic flows are multiplexed together over a single transmission facility, contention may naturally arise between two or more flows needing access to the link at precisely the same time. When this event occurs, a contention resolution (or scheduling) mechanism may be implemented by voice gateway 34 to determine which cell may be permitted to gain access to the link. All of the remaining contending cells may be temporarily queued (i.e., delayed) and contend for access to the link following the complete transmission of the currently selected cell. Due to the statistical nature of this potentially recurring random process, this phenomenon results in network induced cell delay variation (CDV) (or jitter) impairments for all flows as they may be multiplexed and transported throughout an ATM network.

Depending on the internal architecture of an AAL2-based media gateway, there exists the possibility of link contention arising when multiple independent derived voice channels are simultaneously active within a single AAL2 VCC. In this case, temporarily delayed cells could potentially be emitted back-to-back at a line rate of the physical link rather than the PCR specified for the VCC. It should be noted that given the naturally regulated traffic sources in this derived voice application and without the application of VC level traffic shaping, a worst-case burst (i.e., the maximum number of cells that could actually be transmitted on the associated VC back-to-back at line rate) may be bounded by the maximum number of simultaneously active derived voice call sessions.

This same feature (network induced CDV) may occur at the VP level when multiple VCs are multiplexed into a single VPC for transport through one or more ATM transport elements. In this VP aggregation scenario, each of the intervening ATM network elements process the composite traffic aggregate (i.e., all constituent VCs) as a single connection at the next hierarchical (i.e., VP) layer. Typically, when VP level traffic aggregation is employed in a network, a VP level egress traffic shaping (or peak cell rate limiting) function may be performed at the point where the VPC originated, creating what may be commonly referred to as a 'shaped' VP tunnel. Shaped VP tunnels ensure that the aggregate traffic flow conforms to a VP level traffic contract so that cells (associated with the VP tunnel) may be judged as conformant (at the VP level) by the network if the VP tunnel were subjected to policing.

The approach provided in voice gateway 34 for bandwidth/buffer resource partitioning and sharing may be based upon several internal attribute values which impact how internal resources may be utilized to support multi-service traffic flows through fabric ports and physical/virtual ANMs 40a and 40b ports. Some of these may be static attributes whose values may be used upon system initialization (e.g., buffer partitions among service classes), while others serve as dynamic user-configurable network planning parameters that may be adjusted by the operator.

Cell buffering may be executed by voice gateway 34 by statically partitioning independent buffer pools for ingress and egress traffic, which are then further partitioned among the various traffic classes that may be supported. Traffic scheduling/shaping may be done selectively on an individual VP/VC, service class, and/or physical/virtual port basis for both ingress and egress cell streams. Class-based ingress/egress buffer pools may be shared across all related ports, e.g., ingress CBR traffic destined to any one of the fabric ports may share the CBR ingress buffer pool. The buffer sharing mechanisms may be optimized on a per service class basis to both enhance individual VP/VC's performance and maximize connection capacities.

Embedded traffic scheduling/shaping may be managed by voice gateway 34 using independent cell stream access to multiple internally defined bandwidth resource pools, each comprising one of two 'types' of bandwidth resources. The portion of a bandwidth pool that may be explicitly allocated to a given traffic flow is the guaranteed bandwidth as described above. Guaranteed bandwidth may be reserved for, and then subsequently allocated (i.e., committed) to, various types of traffic flows according to their associated service categories, e.g., CBR, RtVBR, shaped VP tunnel, and derived voice applications (i.e., all traffic categories that require guaranteed access to a specific amount of link bandwidth). For purposes of internal bandwidth and external physical/virtual link capacity management, the corresponding algorithm implemented may model shaped VP tunnel and/or system originated/terminated derived voice services as independent service categories. From an external network view perspective, shaped VP tunnels may be treated as simply CBR permanent virtual paths (PVPs) regardless of the service category. Similarly, VC shaped derived voice connections may be treated externally as either RtVBR or CBR permanent VCs (PVCs).

Explicit guaranteed bandwidth allocations may be made by configuring the appropriate scheduling policy when a subscriber/VC/VP is admitted to the subscriber pool. When excess bandwidth is available, it may be provisioned across multiple service classes, and then among traffic flows within a given class. Dynamic inter-class sharing of excess bandwidth may be controlled through various weight factors associated with each of the service categories that may benefit from access to non-guaranteed excess bandwidth, i.e., generally all services. Weights may be associated with each class and excess bandwidth may be provisioned among all active classes with backlogged traffic in proportion to their assigned weights. These weight factors may be assigned weights in proportion to the aggregate guaranteed/minimum bandwidth allocated to the connections associated with each service category.

Voice gateway 34 implements internal ATM transport and switching architecture that may employ three primary stages of cell buffering: ingress fabric port level queuing, central fabric queuing, and egress fabric port level queuing. The cell buffers associated with voice gateway 34 (and its associated switch fabric elements 44a-44c) may be organized as a single resource pool. Although access to free buffer resources may be prioritized by central fabric buffer management, in times of congestion, this may change in accordance with particular needs. The centralized buffer resource pool supports any/all traffic flows through the fabric regardless of their associated internal traffic class or inlet/outlet ports.

Buffer management functions as described above may be provided within any suitable element of voice gateway 34, such as within ATM port controllers 58a and 58b for example, to optimize the utilization of the ingress/egress fabric port level buffer resources. Upon initialization, the total cell buffer capacity on each ANM 40a and 40b may be statically partitioned amongst ingress/egress and then further subdivided into multiple independently reserved subpools for each direction based on internal traffic classes. The initial configuration of the fixed buffer partitions may be set prior to initiating packet processing.

In an ATM environment, voice gateway 34 may support a full range of link, VP identifier (VPI) and VC identifier (VCI) values using a suitable look up process. Hence, there may not be a need for the pre-allocation of VPI and VCI blocks on any given link. In addition, voice gateway 34 may identify and separate AAL2 channel identifiers (CIDs). This allows voice gateway 34 to switch at the AAL2 and CID level. In an IP environment, voice gateway 34 may search an arbitrary bit field for packet identification. For IP/ATM based virtual private networks (VPNs), the IP address may be reused across ATM connections.

Voice gateway 34 may provide per VC and/or per VP queuing for ATM applications. Voice gateway 34 may also be configured to support either IP source or type of service queuing where appropriate. Voice traffic may be buffered in a dedicated buffer space from data traffic. Voice gateway 34 may also provide various scheduling algorithms for ATM or IP applications. Voice gateway 34 may use single and dual 'leaky bucket' shaping algorithms for selected traffic. For switched traffic, voice gateway 34 may use any number of suitable algorithms, such as: shaped virtual clock (ShVC), starting potential fair queue (SPFQ), or weighted round robin (WRR) for example. Voice gateway 34 may also merge traffic classes by providing class level, rate based guarantees, and/or weighted access to unused bandwidth. For IP over ATM applications, voice gateway 34 may provide VC merging capabilities for egress data. Voice gateway 34 may use a suitable algorithm for shaping the merged flow to a proper conformance, whereby IP data flows may merge onto a single VC.

Voice gateway 34 may observe quality of service from two viewpoints. First as a flow origination point and second as a flow switching point. As an origination point, voice gateway 34 may seek to generate traffic streams that will comply with network engineering goals and downstream policing entities. For example, voice gateway 34 may originate CBR, RtVBR, NtVBR, and UBR traffic types. In any of these traffic types, voice gateway 34 may ensure that the associated traffic parameters may be met with a minimum of cell delay variation tolerance and burst tolerance. As a switching point, voice gateway 34 may merge compliant (i.e. policed) flows onto congested links with a minimum of traffic parameter distortions. CBR flows may be switched at a top priority, thereby minimizing its delay and CDVT impact.

Turning to the internal elements that may be provided in voice gateway 34, each ANM 40*a* and 40*b* may provide functions in the both the ingress and the egress direction. In the ingress direction, ANMs 40*a* and 40*b* may provide per framer port VPI/VCI identification, cell header translation, traffic policing, operation-administration-maintenance (OAM) functions, and general cell counting operations. ANMs 40*a* and 40*b* may support simultaneous ingress connections. Each connection may be any combination of framer port, VPI and VCI. The addresses do not have to be arranged in a contiguous space and incoming cells may be identified in any suitable fashion.

ANMs 40*a* and 40*b* may monitor traffic flows with a per VC algorithm. ANMs 40*a* and 40*b* may also perform F4 and F5 level OAM per connection. In the egress directions, ANMs 40*a* and 40*b* may provide cell identification, translation and OAM insertion. ANMs 40*a* and 40*b* may support simulation egress connections. Each connection may be identified in a direct lookup fashion. ANMs 40*a* and 40*b* may translate cells from an internal VP/VCI to an external VP/VCI. ANMs 40*a* and 40*b* may also provide interrupts to indicate counter roll over, F4/F5 fault detection, excessive bit errors (during performance monitoring), and excessive non-compliant cells.

Switch fabric elements 44*a*-44*c* represent a centralized switch fabric that may include a control processor (and support permanent virtual connection applications) and distributed stacks for other suitable applications. Switch fabric elements 40*a*-40*c* may each include a demultiplexer 62*a* and 62*b* that operate to demultiplex or fan out incoming data in any suitable ratio, such as 1:8 for example, over 200 Mega-bits per second (Mbps) links. This demultiplexing may reflect a second level of data processing, where initial demultiplexing occurred prior to the data streams arriving at switch fabric elements 44*a*-44*c*. Additionally, one port of demultiplexers 62*a* and 62*b* may be allocated for interconnecting the switch fabrics of switch fabric elements 44*a*-44*c*. Switch fabric elements 44*a*-44*c* may interface with telephony port module 48 using suitable switching interfaces such as T1 lines, channelized DS3 links, STS, or any other suitable communications protocol in accordance with particular needs.

Inter-processor communication traffic may be incorporated into ATM switch fabric elements 44*a*-*c* with voice and data traffic. A processor may be dedicated to every network card within voice gateway 34. Each processor may have a dedicated high speed communications channel to each other processor in the system. Channels may be dynamically established and removed as needed. Minimum amounts of guaranteed bandwidth may then be properly allocated for each processor, where if bursty processor communications may be required, excess bandwidth may be allocated.

TPM 48 may include a suitable SAR element, as well as multiple DSP farm architectures. TPM 48 provides for the multiplexing and demultiplexing of data. TPM 48 may include a TDM interface communications link allowing independent assignment to any selected framing element within TPM 48. TPM 48 supports voiceover ATM or voiceover IP/Ethernet. The DSP farm architectures may be dimensioned such that they support any suitable number of channels or other network features in a soft-switching environment. TPM 48 may receive AAL2 streams of data and assigns each channel to a corresponding DSP element or DSP resource. Each of the DSP elements convert the incoming data streams back to a TDM format. TPM 48 may collect cells from the TPM SARs in the ingress direction. Cells may be collected from a UTOPIA bus (or any other suitable bus element) in a round robin fashion for example. In the egress direction, cells may be fanned out to the TPM SARs. SARs within TPM 48 may be capable of simultaneously originating and terminating AAL5, AAL2, and AAL1 VCs.

ATM port controllers 58*a* and 58*b* may provide ATM layer functions necessary to support appropriately differentiated QoS for various ATM traffic classes. The functions and features available in ATM port controllers 58*a* and 58*b* may provide controlled granularity at the cell, connection, and system levels and facilitate the design of modular controls in voice gateway 34. These controls may be applicable at different time scales of operation while interacting as an integrated set of controls to support a wide variety of services while simultaneously promoting efficient sharing of system resources. ATM port controllers 58*a* and 58*b* may be configured in a variety of switching modes for flexible operation.

ATM port controllers 58*a* and 58*b* may also support aggregation of ATM traffic at the physical layer interface (full duplex). ATM port controllers 58*a* and 58*b* may perform user network interface (UNI) and network node interface (NNI) management functions. ATM port controllers 58*a* and 58*b* may also perform VPI/VCI translation for connections on an egress flow while allowing reusability of same VPI/VCI on different elements. ATM port controllers 58*a* and 58*b* may also provide input/output (bi-directional) queue management for a corresponding scalable switch fabric. ATM port controllers 58*a* and 58*b* may support multiple traffic classes via scheduling algorithms, including a suitable scheduler to provide per VC QoS assurances. ATM port controllers 58*a* and 58*b* may also provide OAM fault management functions for loop back, continuity check, defect indication on connections, and performance monitoring.

Each fabric port controller 60 may provide a suitable number of buffers, adequate buffer management, and proper traffic scheduling operations for voice gateway 34. The buffer management function divides the buffers into two sections: ingress and egress. The buffer manager may then further divide each section into multiple classes. As each class becomes more congested, the maximum queue length for VCs within that class may be suitably decreased. Traffic scheduling functions may be implemented in both directions also. VC queues may be emptied depending on their service type.

The different traffic classes may be merged at three different priority levels: CBR, guaranteed bandwidth, and excess bandwidth. The CBR priority may receive the highest priority in one example embodiment of the present invention. This priority may be used for all CBR traffic. Thus, whenever a CBR cell may be present, it may be the next cell sent or communicated. The next priority may be guaranteed bandwidth, whereby other classes of traffic aggregates may be assigned a fixed rate in the guaranteed bandwidth scheduler. The last priority may be the excess bandwidth priority. The excess bandwidth scheduler may give weighted access to unused link bandwidth.

It may be important to note that many of the operations provided by ANMs 40a and 40b (and associated elements therein) are similar to the operations provided by switch fabric elements 44a-c (and associated elements therein). One difference however may be that the Egress side of fabric port controller 60 may be augmented to support an over subscribeable shaper. AAL2 packets from different TPM cards (within TPM 48) may be carried on internal ATM VPI/VCIs. These VPI/VCIs may be directed to a single VC context in fabric port controller 60. The shaper peak rate may limit the aggregate of the AAL2 flows into a single coherent VC. As VP functionality may be added to voice gateway 34, these AAL2 flows may be shaped into large shaped VP flows.

Suitable algorithms may be used to govern bandwidth allocation in voice gateway 34 in accordance with the teachings of the present invention. Resource allocation commitments may be made by using the specified traffic descriptors and QoS objectives associated with each new provisioning request in order to compute an effective guaranteed bandwidth and buffer resources required to support the request. These effective bandwidth/buffer resource requirements may be continually analyzed along with current resource availability. Provided below are a number of algorithms that dictate a protocol for classes associated with voice gateway 34. These algorithms are provided as examples only, numerous other algorithms may be used where appropriate and according to particular needs.

The algorithm pertaining to transit CBR VP/VC connection admission requests may be used to allocate sufficient guaranteed bandwidth resources to all CBR flows so that each individual connection's specified commitment may be assured and that, overall, CBR VP/VC connections experience negligible delay. The scheduling discipline supporting transit CBR flows may use a non-work conserving shaped virtual clock algorithm that actually reshapes each independent cell stream to conform to a specified guaranteed rate and eliminates/minimizes any accumulated/induced CDV. The associated embedded CBR scheduling hardware resources may support any suitable number of unique rates. The algorithm may operate to map the user specified PCR value associated with each requested CBR flow to one of the supported CBR scheduling rates, choosing the lowest scheduling rate that meets or exceeds the PCR requirement. The effective bandwidth requirements associated with the chosen CBR scheduling rate may be then used to make the admission decisions.

As compliant CBR cell flows may be by definition non-bursty, CBR connections may require minimum buffer resources. Therefore in order to maximize the number of potential CBR connections that may be supported as well as obtain the most optimum buffer resource utilization, each of the CBR buffer resource pools may be operated in a fully shared mode. The corresponding dynamic buffer sharing adaptive threshold values corresponding to each connection may be set to low levels regardless of the buffer utilization levels.

Rather than calculating an effective bandwidth requirement for each individual RtVBR connection, the provided algorithm may estimate the effective bandwidth requirement for a statistically multiplexed aggregate of all RtVBR traffic streams sharing a common transmission link. The estimated aggregate bandwidth requirement calculation may be based upon a Gaussian approximation resulting in increased statistical gain as the number of potential active sources increases and/or as the desired cell loss ratio (CLR) objective may be relaxed. The effective bandwidth calculation utilizes two user configurable tuning parameters to allow an operator to adjust the performance of this estimated bandwidth model to better approximate the traffic characteristics of the offered load actually experienced in a given operational network scenario. An associated 'mean correction factor' element allows the user to compensate for general mis-specification of the sustained cell rate (SCR) traffic descriptors for the RtVBR flows. The second 'tuning parameter' may be an associated 'variance correction factor' attribute, which allows the user to specify a desired statistical multiplexing strategy juxtaposed with a general QoS objective in terms of the likelihood of cell loss.

The algorithm pertaining to transit UBR/UBR plus an additional element of bandwidth (UBR+) VP/VC connection admission requests allocates sufficient guaranteed bandwidth resources to all UBR+ flows so that each individual connection's specified minimum cell rate (MCR) commitment may be assured. In addition, the goal of the assigned UBR/UBR+ associated scheduling resources may be to ensure that any/all backlogged UBR/UBR+ VP/VC flows contending for a given transmission link receives a fair share access to any available excess bandwidth.

Scheduling hardware resources within voice gateway 34 may control the statistical multiplexing of all independently queued UBR/UBR+ traffic streams sharing a common transmission link, and may implicitly shape the aggregate rate of the combined traffic to conform to a provisioned partition of aggregate guaranteed link bandwidth capacity. In addition to this allocation of guaranteed link capacity, the UBR/UBR+ schedulers also may take advantage of the availability of any shared excess link bandwidth resources. The scheduling discipline supporting this UBR/UBR+ connection multiplexing and aggregate traffic shaping may use a work-conserving algorithm commonly referred to as weighted round robin (WRR). In an overload condition (i.e., when the total offered load exceeds the available scheduler output capacity), this algorithm ensures that all flows may be served in proportion to their assigned weight factor.

The aggregate effective guaranteed bandwidth requirement for all transit UBR/UBR+ VP/VC connections sharing a common transmission link may be calculated by simply summing the MCR values associated with each UBR/UBR+ VP/VC connection. This aggregate guaranteed effective bandwidth requirement may be used for evaluating admission decisions. If admitted, this calculated aggregate guaranteed effective bandwidth requirement may be suitably allocated. This calculated aggregate guaranteed effective bandwidth requirement may be also used as the provisioned value for defining the UBR/UBR+ scheduler's aggregate guaranteed bandwidth resource partition.

The algorithm pertaining to originated/terminated VC shaped AAL2 derived voice connection admission requests may allocate sufficient guaranteed bandwidth resources to ensure voice quality when any/all connections may be active, while achieving a controlled degree of statistical gain when multiplexing multiple independent flows contending for a common transmission link. As with transit RtVBR connections, the resource allocation strategy for AAL2 derived voice connections may be based upon a bufferless model so that active derived voice flows experience negligible delay, CDV, and CLR.

Similar to the case for CBR flows, the scheduling resources utilized for VC shaped AAL2 derived voice connections may perform explicit traffic shaping for each independent cell flow. However, customized scheduling logic may be utilized to allow a PCR shaping function to be performed simultaneously for an extremely large number of independent streams in a potentially overbooked configuration. A two stage hierarchical scheduling discipline may be used to facilitate statistical multiplexing of multiple independently shaped periodic on-off flows into a single rate-limited aggregate composite cell stream. The first stage (i.e., lowest level) rate-based scheduler may independently shape any number of cell flows for multiple service flow rates. A second stage (i.e., higher-level) scheduler may use a WRR scheduling discipline to multiplex each of the independently shaped cell streams into a single rate-limited aggregate composite cell stream. In an overload situation, the aggregate bandwidth may be dynamically allocated to each independent flow in proportion to the desired service rate. Any cell loss incurred while the hierarchical scheduler is in an overload condition may be distributed to each of the currently active flows in proportion to their corresponding service rate (minimizing the service quality impact on all currently active cell flows). This algorithm maps the user specified PCR value associated with each requested originated/terminated VC shaped AAL2 derived voice connection to one of the service flow rates, choosing the lowest flow rate that meets or exceeds the connection's PCR requirement. The calculated aggregate derived voice effective bandwidth requirement may be used to make the admission decisions. If a provisioning request is accepted, the new calculated aggregate derived voice effective bandwidth requirement may be allocated. This calculated effective bandwidth may also be used as the provisioned rate limit enforced by the second stage scheduler.

Due to the similarities between the algorithms employed for transit RtVBR flows and VC shaped derived voice connections, both of these service categories may share a common set of buffer resource pools. The only difference in the buffer management support for these two service categories may be the algorithm used to calculate the dynamic buffer sharing adaptive threshold values corresponding to each connection. For a VC shaped derived voice connection, the threshold values may be calculated based on the user specified PCR value.

The algorithm pertaining to a CBR shaped VP tunnel request may be used to allocate both a dedicated VP tunnel hardware scheduling resource (i.e., VP shaper element) as well as sufficient guaranteed physical link (i.e., an ANM port) bandwidth resources to the ensure that the specified aggregate shaped VP tunnel's PCR capacity may always be met. A VP shaper element may necessitate that a completely private partition of the available guaranteed physical link (i.e., an ANM port) bandwidth resources equivalent to the specified shaped VP tunnel's PCR be allocated when an associated shaped VP tunnel may be initially established. A network planner may use this bandwidth management feature to reserve a portion of an ANM port's guaranteed physical link bandwidth resources to support a projected future demand for shaped VP tunnel services. Any unallocated portion of this reserved link bandwidth may be used as additional excess shared bandwidth resources to improve performance for traffic associated with other service categories until such time that it may be needed to support a shaped VP tunnel established.

A VP shaper element may provide the necessary egress scheduling function required to statistically multiplex traffic from multiple independently queued lower tier egress flows into a single rate-shaped higher tier aggregate egress flow (i.e., VC to VP tunnel merge). Shaped VP tunnels may be classified as either non-hierarchical or hierarchical, meaning that each of the lower tier constituent VC link (VCL) streams being statistically multiplexed into the VP tunnel may be associated with the same (i.e., one common) service category or may be associated with any of a number of enabled service categories, respectively.

Generally, voice gateway 34 may support any suitable number of non-hierarchical VP shaper elements, each of which may be identical from a bandwidth allocation and scheduling point of view, but differ from an assignment and buffer management perspective. The VP shaper elements may be physically arranged into multiple groups consisting of multiple elements and the elements may be assigned to a given ANM port on a per group basis. In addition, each non-hierarchical VP shaper element within a given group may be pre-assigned to a pool of egress buffer resources associated with a given traffic class. Two different configurations may be selected to allow the VP shaper usage to be optimized for either bursty (UBR) or non-bursty (CBR, RtVBR, and/or derived voice) VCL transport.

The algorithm pertaining to controlling CBR VCL admission requests to a nonhierarchical shaped VP tunnel may ensure that the aggregate guaranteed effective bandwidth requirement calculated for all constituent VCLs may be supported by the PCR capacity of the tunnel and that, overall, each of the constituent VCLs experience negligible absolute delay, CDV, and CLR. The aggregate guaranteed effective bandwidth requirement could be calculated simply as the sum of the individual PCR value associated with each of the constituent VCLs. However, the PCR capacity of the shaped VP tunnel may not be fully utilized in order to ensure that the QoS objectives for the constituent CBR-VCLs (namely negligible CDV and CLR) may consistently be met. Therefore, a single user configurable QoS related tuning parameter may be used as a scaling factor for the aggregate effective guaranteed bandwidth requirement, which effectively controls the target utilization of the VP tunnel.

The algorithm pertaining to controlling RtVBR VCL admission requests to a nonhierarchical shaped VP tunnel may ensure that the aggregate guaranteed effective bandwidth requirement calculated for all constituent VCLs may be supported by the PCR capacity of the tunnel and that, overall, each of the constituent VCLs experience negligible delay, CDV, and CLR. The aggregate guaranteed effective bandwidth for the constituent RtVBR VCLs may be calculated using the same algorithm that may be used for transit RtVBR connections as described above. As such, two user configurable tuning parameters may be provided (per VP tunnel) to allow an operator to adjust the performance of this estimated bandwidth model to better approximate the traffic characteristics of the offered load actually experienced in a given operational network scenario.

The algorithm pertaining to controlling UBR/UBR+ VCL admission requests to a non-hierarchical shaped VP tunnel may ensure that the aggregate guaranteed effective bandwidth requirement calculated for all constituent VCLs may be supported by the PCR capacity of the tunnel. The aggregate effective guaranteed bandwidth requirement for the constituent UBR/UBR+ VCLs may be calculated using the same algorithm that may be used for transit UBR/UBR+ connections. Similarly, the dynamic buffer sharing may be controlled using the same mechanism as used for transit UBR/UBR+ connections.

The algorithm pertaining to controlling derived voice VCL admission requests to a non-hierarchical shaped VP tunnel may be used to ensure that the aggregate guaranteed effective bandwidth requirement calculated for all constituent VCLs may be supported by the PCR capacity of the tunnel and that, overall, each of the constituent VCLs experience negligible delay, CDV, and CLR. The aggregate guaranteed effective bandwidth for the constituent derived voice VCLs may be calculated using the same algorithm that may be used for VC shaped derived voice connections. As such, two user configurable tuning parameters may be provided (per VP tunnel) to allow an operator to adjust the performance of this estimated bandwidth model to better approximate the traffic characteristics of the offered load actually experienced in a given operational network scenario. Similarly, the dynamic buffer sharing may be controlled using the same mechanism as used for transit RtVBR connections.

As described above, inter-class sharing of excess bandwidth may be controlled through weights associated with each service classes that may benefit from it. Weights may be associated with each class and excess bandwidth may be shared among all active classes with backlogged traffic in proportion to their weights. Upon initialization/boot up the buffer capacity on ATM port controllers $58a$ and $58b$ may be statically partitioned among ingress/egress, and then further subdivided into multiple pools based on the ATM traffic classes (CBR, RVBR, NVBR, ABR and UBR for example) as described above. For purposes of teaching, a number of equations are provided below that illustrate some, but not all, of the operations and algorithms being executed by voice gateway 34. Where appropriate, these equations may be substituted with other processes that effectuate one or more of the operations or features of voice gateway 34.

To specify an initial gross buffer partitioning, parameters may be set that correspond to the total amount of buffer devoted to the ingress and egress, $C^{total,i} C^{total,e}$, further subdivisions among the traffic classes, $C^{s,i}, C^{s,e}$ where $s \in S$ correspond to one of the multiple service classes $S=\{CBR, RVBR, NVBR, ABR, UBR\}$. For ingress buffering, $C^{total,i} = \sum_{s \in S} C^{s,i}$ providing a similar result on egress buffers. Ingress buffer pools may be shared by traffic queued up for the possible destination ports. By contrast, the egress buffer pools on ANMs $40a$ and $40b$ may be shared by schedulers associated with various physical subports.

There may be two basic contexts where resource allocation is performed: on shaped VPs in creating a new VC, IAD, or derived voice subscriber, and on egress subports (and ingress switch ports) in creating a new shaped VP, VC, VP, VC within a VP, IAD, or derived voice subscriber. Each requires accounting for the total resources allocated and thus those available to support new requests. First consider accounting for bandwidth on non-hierarchically shaped VP n on subport m on ANM 1. Each such VP may have an associated peak cell rate $PCR_{l,m,n}^{d}$ in each direction $d \in \{Ingress, Egress\}$. To compute the required effective bandwidth required by VC supported by the VP, may be important to keep track of its VCs and/or derived voice subscribers. Letting $N_{l,m,n}^{s,d}$ denote the set of VC's of each type $s \in \{CBR, RVBR, UBR\}$ currently associated with VP n on ingress or egress i.e., $d \in \{Ingress, Egress\}$. Further let $N_{l,m,n}^{v}$ denote the set of derived voice subscribers currently associated with the VP. The total effective bandwidth required $B_{l,m,n}^{s}$ for each service type $s=\{CBR, RVBR, UBR\}$ may be then given by $$B_{l,m,n}^{s,d} = b_s(N_{l,m,n}^{s,d}, t_{1,l,m,n}^{s}, t_{2,l,m,n}^{s})$$

where the functions $b_{CBR}(\ )$, $b_{RVBR}(\ )$, $b_{UBR}(\ )$ are used for computing effective bandwidths on shaped VPs defined above. In general service or VP specific parameters $t_{1,l,m,n}^{s}$ $t_{2,l,m,n}^{s}$ may control QoS at the shaped VP level. Similarly for voice, i.e. where s=V, the equation defines:

$$B_{l,m,n}^{VB} = b_v(N_l^v, m, n \cdot t_l^v, l, m, n), \text{ and } B_{l,m,n}^{EOC} = \sum_{j \in IAD_{l,m,n}} b_{eoc,j}$$

where $IAD_{l,m,n}$ may be the set of IAD's 18 associated with VP n, which have their EOC function and enabled and where $b_{eoc,j}$ may be the required embedded operations channel (EOC) bandwidth for IAD j. Thus the total bandwidth allocation for voice services on the VP may be given by $$B_{l,m,n}^{V,d} = B_{l,m,n}^{VB} + B_{l,m,n}^{EOC}$$

in either direction $d \in \{Ingress, Egress\}$. As explained above, a derived voice subscriber may also require bandwidth to be set aside to support its hairpin connection to a SAR subport when it may be off-hook. Thus it also contributes to the bandwidth requirements to that subport, i.e., $U_l^{SAR-v}$.

Upon servicing a request to setup (or tear down) a VC or derived voice subscriber on a given shaped VP, various checks may be made. The basic steps may be to: 1) compute the bandwidth allocation that would be needed to meet the QoS requirements on the VP, and check whether the bandwidth may be available; 2) check whether the operator specified bandwidth sharing rules (i.e., max, min for various service types) would be violated for the VP; 3) update the bandwidth allocations required on the subport; 4) (if all is satisfactory) issue warnings where appropriate, update all running sums and allocate resources; and 5) each VC that is configured may require further dynamic buffer sharing parameters and/or shaped VP bandwidth sharing weights to be set.

The steps for performing resource allocation on a subport m on ANM l and switch port l is provided below. For shaped VPs, it may be necessary to keep track of sets of VCs $N_{l,m}^{s,d}$ of service types $s = \{CBR, RVBR, UBR\}$ and $d \in \{Ingress, Egress\}$ configured on the subport. The effective bandwidth for each service type may then be computed based on $$B_{l,m}^{s,d} = b_s(N_{l,m}^{s,d}, t_{1,l,m}^{s}, t_{1,l,m}^{s}).$$

where the $b_{CBR}(\ )$, $b_{RVBR}(\ )$, and $b_{UBR}(\ )$ have been defined and depend on the subport and service s specific parameters $t_1$, and $t_2$. These functions may differ from those used to compute effective bandwidth on shaped VPs, in particular that for CBR service.

Similarly for voice, i.e., s=V, define $N_{l,m}^V$ as the set of shaped VC subscribers associated with subport m, and define $$B_{l,m,n}^{VB} = b_v(N_1^V, m, t_{1,l,m,n}^V), \text{ and } B_{l,m,}^{EOC} = \sum_{j \in IAD_{lm}} b_{eoc,j}$$

where $IAD_{l,m}$ may be the set of IAD's 18 directly associated, i.e., not associated with a shaped VP, with subport m that have their EOC function enabled and where $b_{eoc,j}$ may be the required EOC bandwidth for IAD j. The function $b_v(\ )$ computes the effective bandwidth for the subscribers associated with the shaped VP. Thus the total bandwidth allocation for voice services on the VP may be given by $$B_{l,m}^{V,d} = B_{l,m}^{VB} + B_{l,m}^{EOC}$$

in either direction d∈{Ingress,Egress}.

As explained above with reference to shaped VPs, all derived voice subscribers also require bandwidth to be set aside to support its connections to the SAR subport when it may be off hook. Thus subscribers supported on voice gateway 34 through shaped VCs and shaped VPs may contribute a bandwidth requirement for the SAR subport, i.e., $U_l^{SAR-v}$. The required bandwidth allocation may be linear in the total number of subscribers associated with a selected ANM 40a or 40b, i.e., $$U_l^{SAR-v} = t^{SAR-v}\beta_{on} \sum_{m \in P_l} \left[ |N_{l,m}^V| + \sum_{n \in SVP_{l,m}} |N_{l,m,n}^V| \right].$$

An engineered scaling factor, $0 \leq t^{SAR-v} \leq 1$, may be added to reduce the amount of bandwidth allocated for this purpose. With the above effective bandwidth functions provided, bandwidth required for any given configuration of VCs, VPs, shaped VPs, IADs, etc. on ANM 40a and 40b subports may be calculated. If the configuration meets the subport sharing and allocation requirements, it may be admissible and resources may be allocated to meet the desired requirements.

Aggregate guaranteed bandwidth allocations on egress may be made on a per support basis depending on the service class. Thus, in particular for non-shaped VP/VCs of service type s, a bandwidth $b_s(N_{l,m}^s)$ may be allocated. In addition each shaped VP n may be allocated its $PCR_n$. per VP/VC bandwidth sharing SPFQ or dynamic buffer sharing parameters may be set according to the mechanisms and algorithms described above.

Another example model for a single resource, e.g., subport or VP with capacity C, in bps, which may be available to support VC shaped terminated derived voice is provided for purposes of illustration. Let $b_{group1}$ denote the bandwidth, in bps, required to support an active group 1 voice connection, and let $b_{group2}$ denote the bandwidth, in bps, required to support an active group 2 voice connection. Heterogeneity among subscribers and bandwidth requirements for line supervision are ignored in this example. Let $\rho_s$ denote the call load offered by a typical single derived voice subscriber, in particular $\rho_s = \lambda_s \mu_s^{-1}$ where $\lambda_s$ at which the subscriber makes new calls $\mu_s^{-1}$ may be the mean call holding time. Thus $\rho_s$ may be the offered load. Assume that this parameter may be the same for subscribers of type group 1 and group 2. The question addressed by one or more of the algorithms provided in voice gateway 34 may be how many subscribers, and of what types, can be assigned to this resource without incurring unacceptable user perceived voice quality. Note that in such a system, there may be traffic variations on two time-scales: (1) at the call level, subscriber lines go on and off hook; and (2) at the cell level where the resource sees a collection of active calls. User perceived voice quality depends on jitter and cell loss seen by a subscriber, which may be off hook. This may be impacted by both the concurrent number of subscribers that may be off hook and the characteristics of the multiplexing of their traffic at the cell level.

Given the fairly large difference in time scales between these two processes it may be assumed that controlling QoS degradation may be primarily done by ensuring the number of active subscribers does not does not exceed the capacity of the resources. Various approaches may be used to get accurate models for the QoS, which in turn could be used to make appropriate bandwidth decisions.

Referring to group 1 subscribers as Type 1 and group 2 subscribers as Type 2. Suppose that $n_1$ subscribers of Type 1 and $n_2$ subscribers of Type 2 are assigned to a resource with capacity C. Recall our assumption that the two types of subscribers have the same activity dynamics, i.e., $\rho_s$ Erlangs. Note that subscribers may be not blocked by this resource, whereby if too many subscribers are active, the resource may be simply overloaded.

From a modeling perspective, this system corresponds to an unconstrained finite population model, which for large capacities, i.e., supporting large numbers of users, may be approximated using the M/G/∞ queue. Unconstrained refers to no blocking of subscriber connections in the subport resources. Below the exact finite population model is used to compute the number of active connections of Type 1 and 2, denoted by a pair of random variables $(N_1, N_2)$. It may be represented by $$\pi(x, y; n_1 n_2) = P(N_1 = x, N_2 = y) = \frac{1}{(\rho_s + 1)^{n_1+n_2}} \binom{n_1}{x}\binom{n_2}{y} \rho_s^{x+y}.$$

The distribution $\pi(x,y;n_1,n_2)$ gives the probability that there may be x,y connections of Type 1 and 2 active if $n_1$ and $n_2$ subscribers have been assigned to the resource.

Note that in turn, when x,y connections of Type 1 and 2 are active, the CLR may be computed connections seen if they shared a capacity C. Letting l(x,y;C) denote this quantity, the average QoS on this resource would then be given by $$E[l(N_1, N_2; C)] = \sum_{x,y} l(x, y; C) \pi(x, y; n_1, n_2)$$

Additionally, suppose that l(x,y;C) corresponds to the loss rate that would be seen on a resource of capacity C if x connections of Type 1 and connections Type 2 were active, i.e., $$l(x,y;C) = [xb_{group1} + yb_{group2} - C]^+.$$

Then $E[l(N_1,N_2;C)]$ corresponds to the average cell loss rate, and the average CLR on the subport resource may be given by $$averageCLR = \frac{E[l(N_1N_2; n_1n_2C]}{n_1\rho_s b_{group1} + n_2\rho_s b_{group2}}.$$

For purposes of design, it may be proper to check whether the above quantity may be acceptable prior to assigning $n_1$ and $n_2$ subscribers of Type 1 and 2 to this resource. Alternative choices for $l( )$ may be made to directly reflect the user perceived voice quality rather than the overall average CLR reflected on the resource.

An approach for determining how many derived voice subscribers may be assigned to a given subport resource may be performed, with capacity C subject to a given voice quality, using an Erlang factor i.e., CLR may be developed based on Erlang dimensioning rules. A derived voice subscriber may be modeled as an on/off source, which when 'on' requires a bandwidth $b_{group1}$, and contributes an offered load $\rho_s$ Erlangs. The bandwidth required to provide line supervision may be ignored at this point.

Consider n such subscribers, then the total offered load on the resource would be $n\rho_s$. The resource may have enough capacity to handle $[C/b_{group1}]$group 1 J active subscribers. Although there will generally be no blocking of active subscribers on the subport resources, one way of assessing the likelihood that the resource becomes overloaded may be by computing what would be the blocking probability on a trunk with offered load $\rho=n\rho_s$ and capacity $m=[C/b_{group1}]$. Specifically $E(\rho,m)$ may denote the blocking probability. To ensure that overloads are rare and thus voice quality may be adequate, resources may be allocated such that $E(\rho,m) \leq \delta$ where $\delta$ denotes the likelihood of call overload on the system, and further may provide a rough measure for the desired voice quality. $\delta$ may be very small, e.g., $10^{-6}$, as it relates to voice quality, while interface groups might be designed to a call blocking on the order of $10^{-2}$, which relates to call level completion QoS. As described above, the Erlang function may be given by $$E(\rho, m) = \frac{\rho^m/m!}{\sum_{i=0}^{m} \rho^i/i!}.$$

Thus, the maximum aggregate load $\rho^*$ that may be supported by the resource subject to a voice quality QoS requirement of $\delta$ may be determined by inverting the Erlang function as follows:

$E(\rho^*,m) = \delta \rightarrow \rho^* = E^{-1}(\delta,m)$.

Accordingly, the maximum number of subscribers that may be assigned to a given resource subject to this voice quality QoS requirements $n(\delta,m)$ may be given by $n(\delta,m) = \rho/\rho_s$.

To ensure that an appropriate number of subscribers are assigned to the resource (with adequate voice quality) it may be feasible to provide that no more than n $n(\delta,m)$ subscribers are assigned to a given element.

All subscribers may share the same activity parameter $p_s$, but have a different peak (i.e., off hook) rate, for example $b_{group2}=b_{group1}/2$. Note that two group 2 subscribers may offer the same mean rate as a single group 1, but also may (at worst) sum up to the same peak rate. Recognizing this fact admission control for heterogeneous subscribers may be carried out as follows. Assume n 1 and n2 denote the number of group 1 and group 2 subscribers that may be assigned to the target resource respectively. To ensure that the desired QoS may be met, adherence to the following equation may be appropriate.

$$n_1 + \frac{1}{2}n_2 \leq n(\delta, m)$$

The implementation requirements for voice gateway 34 to keep track of number of derived voice subscribers of various types assigned to each dedicated resource, e.g., the VC shaped derived voice subscribers assigned to a given subport, and the number of subscribers and their types assigned to each shaped VP are provided below. If C represents the capacity currently available to support shaped VCs on a given subport, and there exists (for purposes of this example) $n_1$group1 and $n_2$group2 VC shaped subscribers assigned to that subport, further it is desired to determine whether a new group 1 subscriber may be assigned to that subport, the following equation should be valid (in optimal conditions).

$$n_1 + \frac{1}{2}n_2 \leq n(\delta, (C-PCR)/b_{group1}$$

In addition, the implementation requirements may also be to ensure that upon assigning new derived voice subscribers to a given resource with capacity C that their weighted sum does not exceed $n(\delta,C/b_{group1}$. It may also be important to ensure that upon creating a new shaped VP with an associated PCR, the bandwidth being taken away from the pool, e.g., no longer available to support Shaped VCs, may be not so large that it forces a violation for the current subscribers. For example if C where the capacity currently available to support shaped VCs on a given subport, and there were currently $n_1$group1 and $n_2$group2 VC shaped subscribers assigned to that subport, and it is desired to set up a new shaped VP with an associated PCR then, it should be true (in optimal conditions).

$$n_1 + \frac{1}{2}n_2 \leq n(\delta, (C-PCR)/b_{group1})$$

If this is not valid, the request for the new VP may be denied.

Each subscriber may be specified by the compression type, e.g., group 1, group 2 and bits per sample, as well as the offered load associated with the subscriber type, e.g., business vs. residential. Subscribers that may dynamically change compression mechanisms may be configured based on the typical case. Given this information, a peak cell rate $PCR_i$ may be determined for an activity level offered load $\rho_i$ for each subscriber i. Furthermore each subscriber i may require a minimal bandwidth $b_{LOS}$ for line supervision.

In provisioning the aggregate guaranteed bandwidth, assume N is a set of possibly heterogeneous subscribers sharing a given resource, e.g., available subport capacity for VC shaped derived voice or a given VP. Let $R_i, i \in N$ be independent random variables modeling the traffic generated by each subscriber. The aggregate load may be then given by $\Sigma_{i \in N} R_i$ and the objective may be to determine the minimum shared bandwidth $b(N,\delta)$ to ensure $$P\left(\sum_{i \in n} R_i > b(N, \delta)\right) < \delta$$

i.e., the probability that the offered load exceeds the allocated bandwidth should generally not exceed $\delta$ under optimal conditions. The parameter $\delta$ may be a rough measure of the aggregate CLR seen by these subscribers, or it may reflect voice quality. Various approaches to estimating $b(N, \delta)$ may be implemented. For example, each subscriber may be modeled as an on/off random variable, estimating the required aggregate bandwidth based on Gaussian approximation. In particular, each traffic flow's i arrival rate may be modeled as a Bernoulli random variable, i.e., $P(R_i=PCR_i=\rho_i$ and $P(R_i=b_{LOS})=(1-rho_i)$ where $\mu_i=E[R_i]=SCR_i=\rho_i(PCR_i-b_{LOS})+b_{LOS}$ and $\sigma_i^2=Var(R_i)=(PCR_i-b_{LOS})^2 \rho_i(1-\rho_i)$ Thus the aggregate rate may then be approximated by a Gaussian random variable $A_N$ with mean and variance given by, $$\mu_{AN} = E\left[\sum_{i \in N} R_i\right] = \sum_{i \in N} \mu_i \text{ and } \sigma_{AN}^2 = P\left(\sum_{i \in N} R_i\right) = \sum_{i \in N} \sigma_i^2.$$

To meet the desired QoS condition, $b(N,\delta)$ may be selected so that $$P\left(\sum_{i \in n} R_i > b(N, \delta) \approx P(A_N > b(N, \delta)) < \delta.\right.$$

A calculation shows that if $t(\delta)$ may be such that $Q(t(\delta))=\delta$, where Q may be the complementary distribution function for a standard Gaussian random variable, such that $P(A_N>b(N,\delta)) \leq \delta \text{iff} b(N,\delta) \geq \mu_{AN}+t(\delta)\sigma_{AN}$ Thus the aggregate bandwidth required to support the set N of connections to meet a CLR of approximately $\delta$ may be given by $$b(N, \delta) = \sum_{i \in N} \mu_i + t(\delta) \sqrt{\sum_{i \in N} \sigma_i^2}$$

Two tuning parameters may be used to provide a more precise bandwidth allocation. The first, $t_1$, may be viewed as a generic overbooking factor. It may reflect the first order impact that overestimates/underestimates the derived voice subscriber's activity model relating to the performance of a subscriber assignment/resource provisioning policy. An operator may start by setting $t_1=1$, provided that traffic activity levels are properly reflected. Eventually $t_1$ may be estimated based on measurements for average loads associated with the resource being provisioned. The second parameter $t_2$ may correspond to the voice quality of service translating to a likelihood of cell loss, and may be increased if the realized CLR, or voice quality is deemed unacceptable, or decreased if a more aggressive resource usage is desired. Using the above approach and given a set of possibly heterogeneous derived voice subscribers N assigned to a given resource, the minimum bandwidth that they share $b(N,\delta)$ to meet the desired voice quality may be computed as described above.

Although the present invention has been described in detail with reference to particular embodiments, it should be understood that various other changes, substitutions, and alterations may be made hereto without departing from the spirit and scope of the present invention. For example, although the present invention has been described with reference to specific equations and precise algorithms, voice gateway 34 may use any suitable processes, software, equations, or steps for effectuating parameters that assign bandwidth values. Additionally, these tools may be modified or changed significantly where appropriate and according to particular communication needs.

Additionally, although voice gateway 34 has been described with reference to multiple internal components provided therein, any suitable elements may be provided in voice gateway 34 in order to effectuate one or more of the operations associated with voice gateway 34. In addition, many of these elements may be combined or eliminated where appropriate. The structure of voice gateway 34 as illustrated in FIG. 2 has only been offered for purposes of teaching and example and should not be construed to limit the scope of the present invention as alterations are made to voice gateway 34 to accommodate specific communications systems and architectures.

Numerous other changes, substitutions, variations, alterations, and modifications may be ascertained by those skilled in the art and it may be intended that the present invention encompass all such changes, substitutions, variations, alterations, and modifications as falling within the spirit and scope of the appended claims.

Moreover, the present invention is not intended to be limited in any way by any statement in the specification that is not otherwise reflected in the appended claims. Various example embodiments have been shown and described, but the present invention is not limited to the embodiments offered. Accordingly, the scope of the present invention is intended to be limited solely by the scope of the claims that follow.

What is claimed is:

1. A voice gateway for receiving data in a communications environment, comprising:
   a switch fabric element; and
   an access network module coupled to the switch fabric element and operable to receive one or more data streams associated with one or more subscribers via one or more ports coupled to the access network module, wherein the switch fabric element includes one or more algorithms associated with traffic management of the data streams, the switch fabric element being operable to assign bandwidth within the voice gateway for the data streams based one or more of the algorithms that use an aggregation of one or more activity characteristics associated with a selected one or more of the subscribers.

2. The voice gateway of claim 1, wherein the bandwidth assigned by the switch fabric element to the data streams corresponds to a virtual connection that is dedicated to a selected one of the subscribers.

3. The voice gateway of claim 1, wherein the bandwidth assigned by the switch fabric element to the data streams corresponds to a virtual pathway that is dedicated to a selected one of the subscribers.

4. The voice gateway of claim 1, wherein the data streams are communicated in a selected one of an Ethernet and an asynchronous transfer mode (ATM) environment.

5. The voice gateway of claim 1, further comprising:
a telephony port module coupled to the switch fabric element and operable to receive one or more of the data streams associated with one or more of the subscribers after the data streams are demultiplexed by the switch fabric element.

6. The voice gateway of claim 5, wherein the access network module further comprises a segmentation and reassembly element operable to receive at least a portion of the data streams and process the portion in order to generate information to be communicated to the switch fabric element.

7. The voice gateway of claim 1, wherein one or more of the algorithms include an Erlang factor that is generated based on the activity characteristics associated with the selected one or more of the subscribers.

8. The voice gateway of claim 1, wherein the switch fabric element includes a fabric port controller that dictates buffer management and traffic scheduling for one or more of the data streams.

9. The voice gateway of claim 1, wherein the voice gateway is included in a central office that is coupled to an access network and a switch that is operable to effectuate asynchronous transfer mode adaptation layer two (AAL2) switching operations.

10. A method for allocating bandwidth in a communications environment, comprising:
receiving one or more data streams associated with one or more subscribers at a voice gateway;
implementing one or more algorithms associated with traffic management of the data streams in order to generate a designated bandwidth value associated with one or more of the data streams; and
assigning the designated bandwidth value to one or more of the data streams based one or more of the algorithms that use an aggregation of one or more activity characteristics associated with a selected one or more of the subscribers.

11. The method of claim 10, wherein the bandwidth value assigned by the switch fabric element to the data streams corresponds to a virtual connection that is dedicated to the selected one or more of the subscribers.

12. The method of claim 10, wherein the bandwidth value assigned by the switch fabric element to the data streams corresponds to a virtual pathway that is dedicated to the selected one or more of the subscribers.

13. The method of claim 10, wherein the data streams are communicated in a selected one of an Ethernet and an asynchronous transfer mode (ATM) environment.

14. The method of claim 10, further comprising:
demultiplexing one or more of the data streams associated with one or more of the subscribers after the data streams are received at the voice gateway.

15. The method of claim 14, further comprising:
segmenting and reassembling a portion of the data streams after the data streams are received at the voice gateway; and communicating the portion of the data streams to a switch fabric element included within the voice gateway.

16. The method of claim 10, wherein the voice gateway is included in a central office that is coupled to an access network and a switch that is operable to effectuate asynchronous transfer mode adaptation layer two (AAL2) switching operations.

17. The method of claim 10, further comprising:
generating an Erlang factor based on one or more of the activity characteristics associated with the selected one or more of the subscribers; and
using the Erlang factor in the one or more algorithms in order to allocate the bandwidth value to one or more of the data streams.

18. The method of claim 10, further comprising:
providing buffer management and traffic scheduling for one or more of the data streams associated with one or more of the subscribers.

19. The method of claim 10, further comprising:
categorizing one or more of the subscribers into one or more groups using one or more of the algorithms; and
providing one or more qualities of service for each of the one or more groups in allocating one or more bandwidth values within the voice gateway to each of the groups.

20. The method of claim 19, further comprising:
reserving a portion of the total bandwidth provided in the voice gateway such that one or more of the subscribers are accommodated in a robust communications cycle in which one or more of the subscribers are generating one or more data streams in a substantially concurrent manner.

21. A computer readable medium having code operable based on computer instructions for allocating bandwidth in a communications environment, the code operable to:
receive one or more data streams associated with one or more subscribers at a voice gateway;
implement one or more algorithms associated with traffic management of the data streams in order to generate a designated bandwidth value associated with one or more of the data streams; and
assign the designated bandwidth value to one or more of the data streams based one or more of the algorithms that use an aggregation of one or more activity characteristics associated with a selected one or more of the subscribers.

22. The code of claim 21, wherein the bandwidth value assigned by the switch fabric element to the data streams corresponds to a virtual connection that is dedicated to the selected one or more of the subscribers.

23. The code of claim 21, wherein the bandwidth value assigned by the switch fabric element to the data streams corresponds to a virtual pathway that is dedicated to the selected one or more of the subscribers.

24. The code of claim 21, wherein the data streams are communicated in a selected one of an Ethernet and an asynchronous transfer mode (ATM) environment.

25. The code of claim 21, further operable to:
demultiplex one or more of the data streams associated with one or more of the subscribers after the data streams are received at the voice gateway.

26. The code of claim 25, further operable to:
segment and reassemble a portion of the data streams after the data streams are received at the voice gateway; and
communicate the portion of the data streams to a switch fabric element included within the voice gateway.

27. The code of claim 21, wherein the voice gateway is included in a central office that is coupled to an access network and a switch that is operable to effectuate asynchronous transfer mode adaptation layer two (AAL2) switching operations.

28. The code of claim 21, further operable to:
generate an Erlang factor based on one or more of the activity characteristics associated with the selected one or more of the subscribers; and
use the Erlang factor in the one or more algorithms in order to allocate the bandwidth value to one or more of the data streams.

29. The code of claim 21, further operable to:
provide buffer management and traffic scheduling for one or more of the data streams associated with one or more of the subscribers.

30. The code of claim 21, further operable to:
categorize one or more of the subscribers into one or more groups using one or more of the algorithms; and
provide one or more qualities of service for each of the one or more groups in allocating one or more bandwidth values within the voice gateway to each of the groups.

31. The code of claim 30, further operable to:
reserve a portion of the total bandwidth provided in the voice gateway such that one or more of the subscribers are accommodated in a robust communications cycle in which one or more of the subscribers are generating one or more data streams in a substantially concurrent manner.

32. A system for receiving data in a communications environment, comprising:
a switch fabric element; and
an access network module coupled to the switch fabric element and operable to receive one or more data streams associated with one or more subscribers via one or more ports coupled to the access network module, wherein the switch fabric element includes one or more algorithms associated with traffic management of the data streams, the switch fabric element being operable to assign bandwidth within a voice gateway for the data streams based one or more of the algorithms that use an aggregation of one or more activity characteristics associated with a selected one or more of the subscribers.

33. The system of claim 32, wherein the bandwidth assigned by the switch fabric element to the data streams corresponds to a virtual connection that is dedicated to a selected one of the subscribers.

34. The system of claim 32, wherein the bandwidth assigned by the switch fabric element to the data streams corresponds to a virtual pathway that is dedicated to a selected one of the subscribers.

35. The system of claim 32, wherein the data streams is communicated in a selected one of an Ethernet and an asynchronous transfer mode (ATM) environment.

36. The system of claim 32, further comprising:
a telephony port module coupled to the switch fabric element and operable to receive one or more of the data streams associated with one or more of the subscribers after the data streams is demultiplexed by the switch fabric element.

37. The system of claim 36, wherein the access network module further comprises a segmentation and reassembly element operable to receive at least a portion of the data streams and process the portion in order to generate information to be communicated to the switch fabric element.

38. The system of claim 32, wherein one or more of the algorithms include an Erlang factor that is generated based on the activity characteristics associated with the selected one or more of the subscribers.

39. The system of claim 32, wherein the switch fabric element includes a fabric port controller that dictates buffer management and traffic scheduling for one or more of the data streams.

40. The system of claim 32, wherein the system is included in a central office coupled to an access network and a switch that is operable to effectuate asynchronous transfer mode adaptation layer two (AAL2) switching operations.

\* \* \* \* \*